Dec. 12, 1967  L. J. WEISMANTEL  3,358,135
ILLUMINABLE SILHOUETTE DISPLAY UNIT
Filed Jan. 14, 1966  3 Sheets-Sheet 1

INVENTOR.
LEO J. WEISMANTEL
BY
MAHONEY, MILLER & RAMBO
BY Wm. V. Miller
ATTORNEYS Dec. 12, 1967     L. J. WEISMANTEL     3,358,135
ILLUMINABLE SILHOUETTE DISPLAY UNIT
Filed Jan. 14, 1966     3 Sheets-Sheet 2
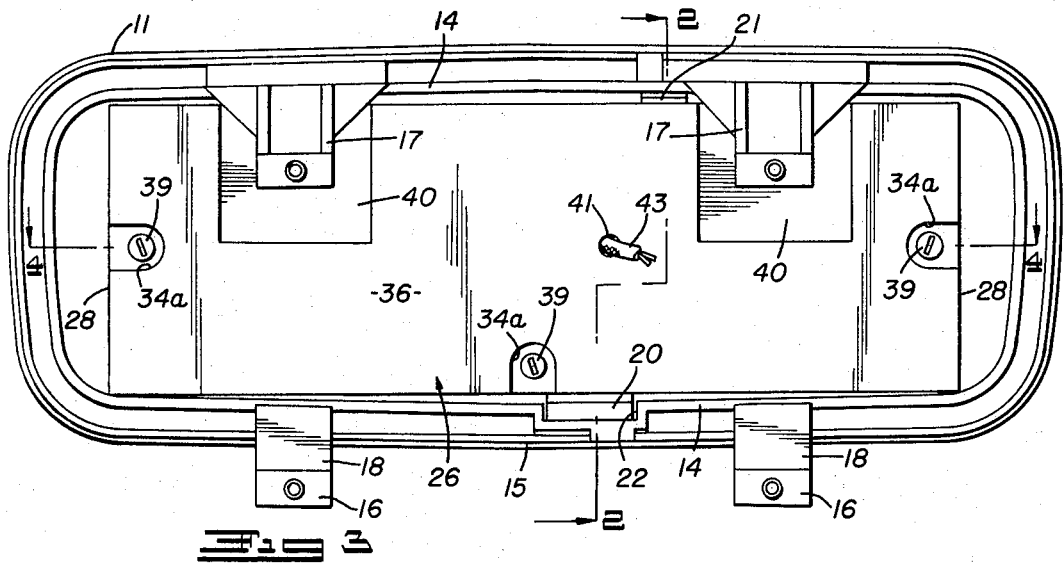
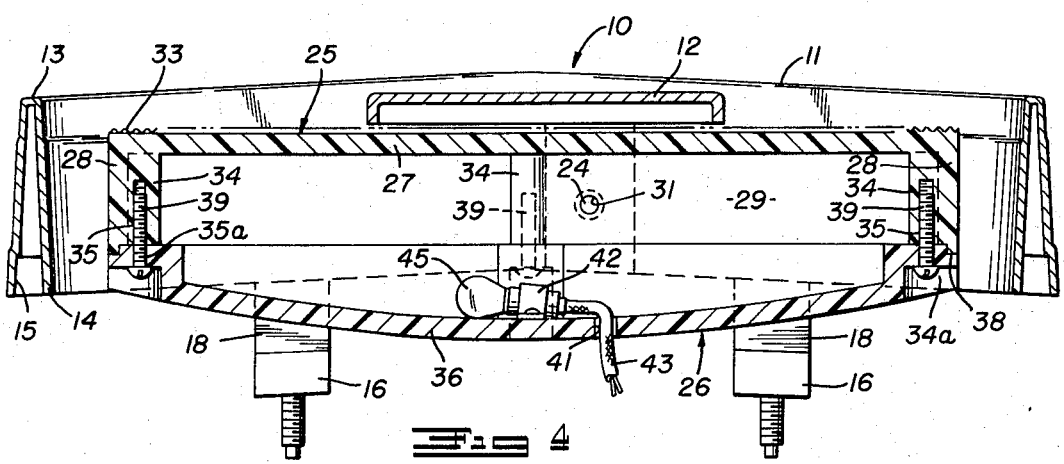
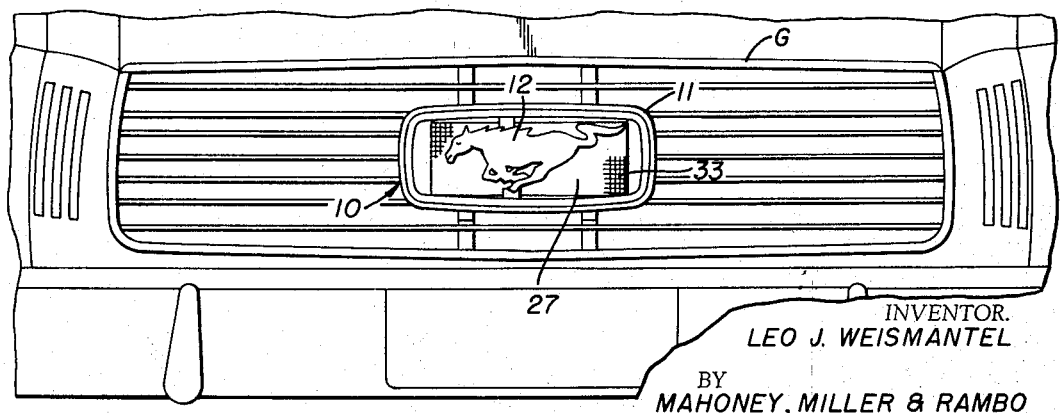
INVENTOR.
LEO J. WEISMANTEL
BY MAHONEY, MILLER & RAMBO
BY
ATTORNEYS

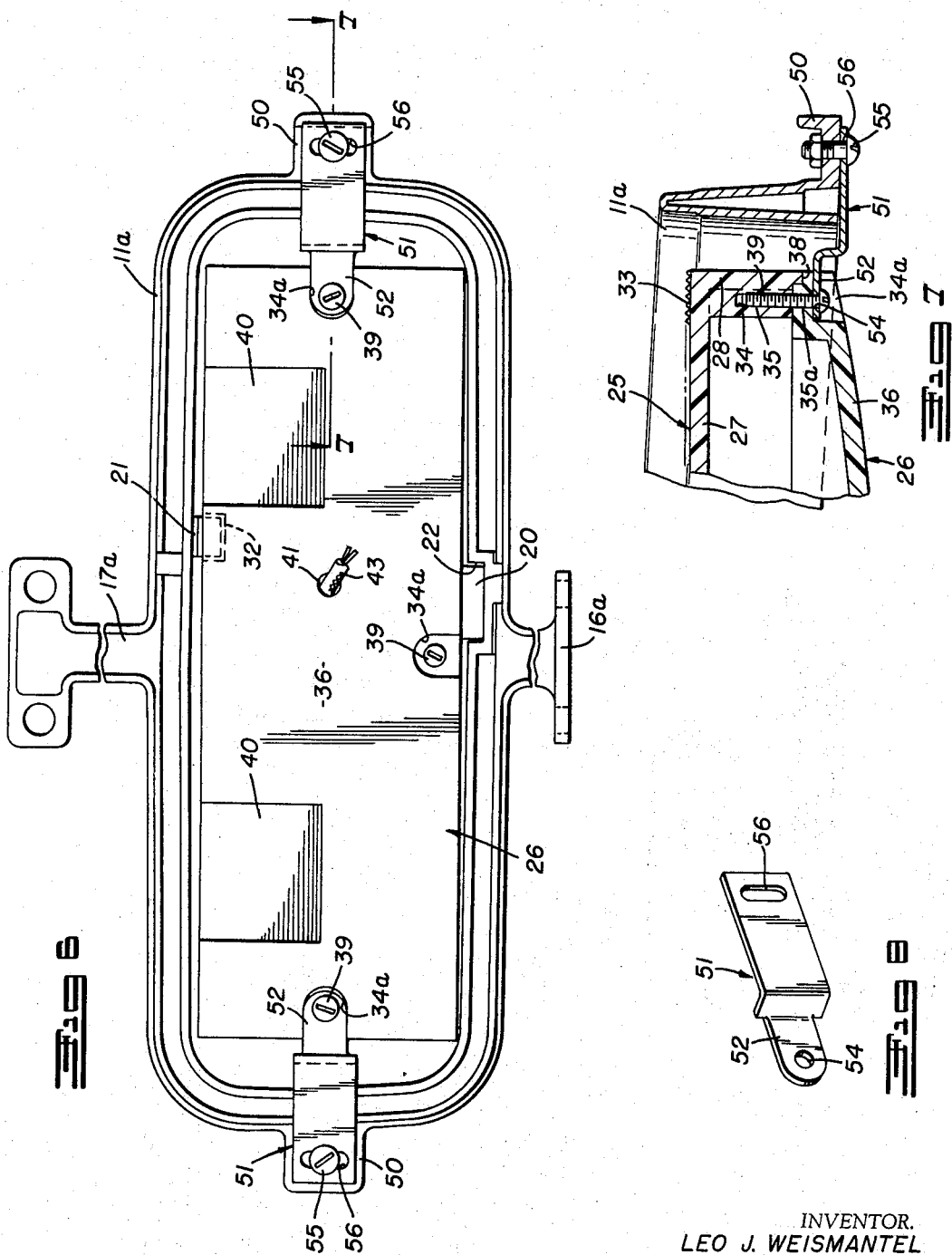

3,358,135
ILLUMINABLE SILHOUETTE DISPLAY UNIT
Leo J. Weismantel, 922 Garfield Ave.,
Lancaster, Ohio 43130
Filed Jan. 14, 1966, Ser. No. 520,566
4 Claims. (Cl. 240—8.11)

ABSTRACT OF THE DISCLOSURE

A light unit which is adapted to be mounted in cooperation with a silhouette-type figurine ornament of the type now commonly provided on an automobile. It not only provides means for illuminating the figurine so as to silhouette it more noticeably, especially during dark hours, but also can provide a running light for the automobile both day and night.

---

In the accompanying drawings, I have illustrated a preferred embodiment of my invention but it is to be understood that details thereof may be varied.

In these drawings:

FIGURE 3 is a rear view of the unit mounted in cooperation with the figurine.

FIGURE 4 is a horizontal sectional view taken along line 4—4 of FIGURE 3.

FIGURE 5 is a front elevational view showing the figurine on the front of the automobile with my illuminable display unit mounted in cooperation therewith.

FIGURE 6 is a view similar to FIGURE 3 but showing my illuminable display unit in cooperation with a silhouette-type figurine having a somewhat different type of frame and mounting.

FIGURE 7 is a horizontal sectional view taken along line 7—7 of FIGURE 6.

FIGURE 8 is a perspective view of a clip used in mounting the device in cooperation with the figurine as shown in FIGURE 6.

Figures 1, 2:
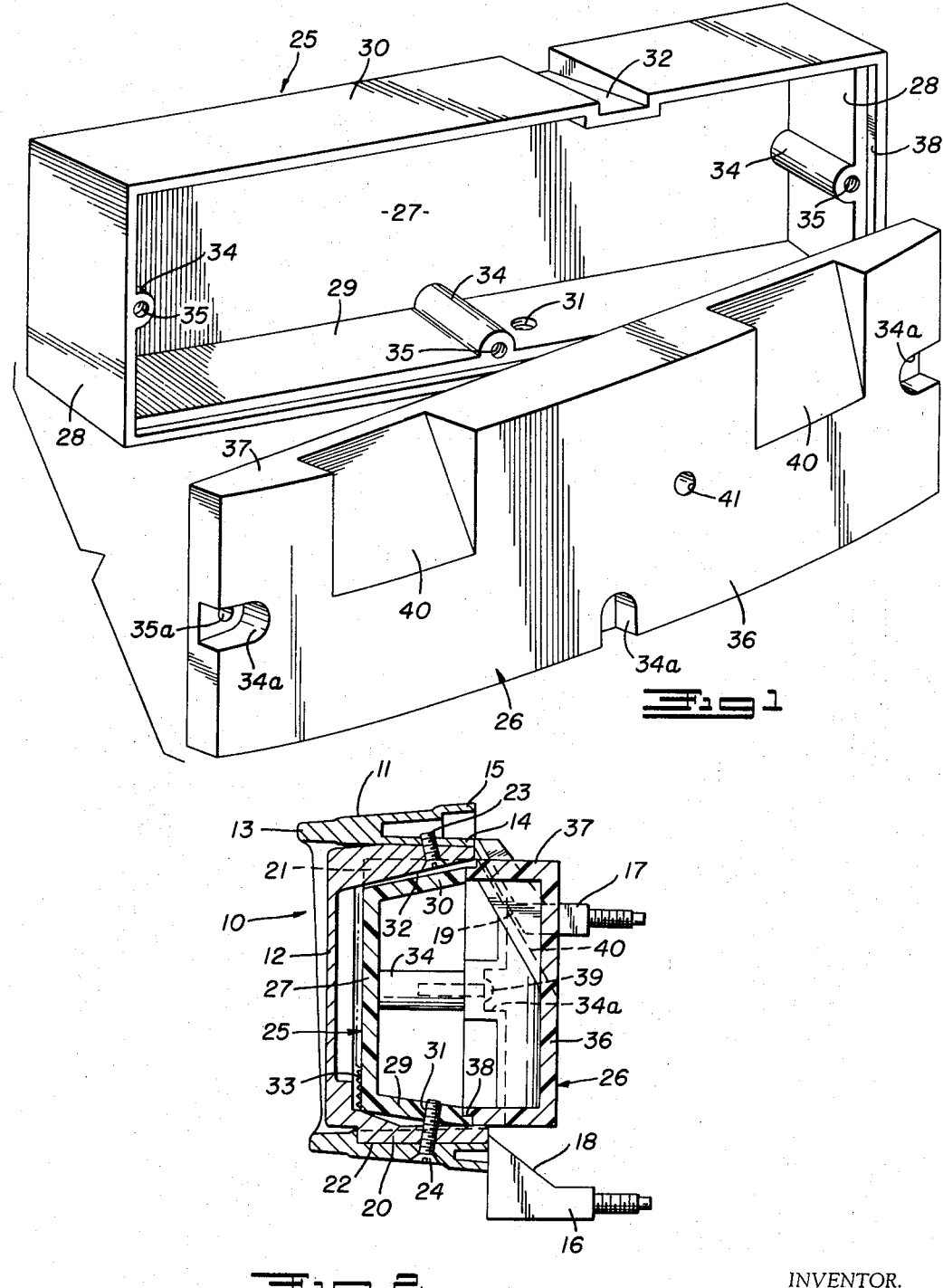
FIGURE 1 is a perspective view showing the two main parts of the illuminable display unit separated.
FIGURE 2 is a vertical transverse sectional view taken along line 2—2 of FIGURE 3 showing the unit mounted in cooperation with a silhouette-type figurine ornament of a type commonly provided on an automobile and having one type of frame and mounting.

With specific reference to the drawings, I have illustrated in FIGURES 1 to 4, inclusive, the structure of an illuminable display unit which is to be mounted in cooperation with a silhouette-type figurine carried by an automobile as suggested in FIGURE 5. I have illustrated in FIGURE 5 the front grille G of an automobile which has an ornament 10 thereon, this ornament being of a type now commonly used on a popular car and which, in the latest model, consists mainly of a frame 11 with a figurine 12. The figurine 12 is fixed centrally within the frame 11 and the frame 11 is suitably mounted on the grille G. The frame 11 and figurine 12 are made of metal.

The metal frame 11 may be termed a border frame and is of substantially rectangular form with rounded corners. It is of substantial depth from front to rear and may consist of a double thickness of metal bent on itself to provide a finished and rounded front lip 13. The inner flange 14 (FIGURE 4) provides an inner smooth surface and the outer flange 15 provides a substantially smooth outer surface. The metal frame 11 is provided with a plurality of mounting lugs for mounting it on the front of the car and, in this instance, these lugs comprise a pair of lower bolt-carrying lugs 16 and a pair of upper bolt-carrying lugs 17. All these lugs project rearwardly from the rear edge of the frame 11. The lower lugs 16 are offset below the lower side of the frame 11 and are provided with rear and upper angular surfaces 18. The upper lugs 17 are offset below the upper side of the frame 11 into the area of the frame and are provided with forward lower angular surfaces 19. The figurine 12 is mounted within the inner flange 14 by means of a lower lug 20 and an upper lug 21 rearwardly extending from the figurine and being integral therewith. The lower lug 20 fits within a recess 22 formed in the lower portion of the flange 14 and the upper lug 21 merely contacts with the inner surface of the upper portion of the flange 14. This upper lug 21 is fairly heavy and has a lower angular surface which projects downwardly and forwardly from the flange 14 whereas the lower lug 20 is flush with the surface of the flange since it fits into the recess 22. The upper lug 21 is fastened to the flange by a screw 23 and the lower lug by a screw 24.

The structure so far described is a standard silhouette figurine ornament. The illuminable unit of this invention is designed to fit into and cooperate with this ornament to more effectively display the figurine 12 in silhouette. My unit is so designed that no changes are necessary in the ornament. The illuminable display unit of my invention is comprised mainly of two sections which are: A front lens section 25 and a rear reflector section 26.

The section 25 is formed of translucent material, preferably plastic, and comprises a front substantially flat, light-diffusing wall or face 27 and an integral rectangular border wall flange projecting rearwardly therefrom and comprising the opposed end walls 28, the bottom wall 29, and the top wall 30. The bottom wall 29 is provided with a tapped screw-receiving hole 31. The top wall 30 is provided on its upper surface with a lug-receiving recess 32 which extends forwardly and rearwardly thereof and has a bottom surface inclined downwardly and forwardly. The front surface of the lens wall 27 may be provided with a prismatic surface 33 to give it better light-diffusing properties. The two end walls 28 and the lower wall 29 carry on their respective inner surfaces the ribs 34 which extend forwardly and rearwardly thereof and are provided with the outwardly-opening tapped sockets 35.

The reflector section 26 is also preferably formed of plastic and may be of substantially opaque material or it may be provided on its inner surface with a coating of reflective paint or the like. It is provided with a main rear wall 36 which is curved from one end thereof to the other so as to provide an inner concave forward reflecting surface and an outer rear convex surface. The wall 36 is also preferably provided with an integral forwardly-projecting border flange 37 of rectangular outline. At its ends and lower edge, the section 26 is provided with outwardly opening notches 34a and at the bottom of these notches are the screw-receiving sockets 35a which will align with the respective sockets 35 when the section 26 is mounted on the section 25. When so mounted, the cooperating adjacent edges of the border flanges on the respective sections 25 and 26 will interfit or telescope (FIGURES 2 and 4) since the edges are shouldered for this purpose as indicated at 38. Suitable screws 39, passing through the openings 35a threaded into the openings 35, will retain the two housing sections in cooperative relationship. The section 26 is provided at its upper edge with a pair of notches 40 which extend from the rear surface of the wall 36 upwardly and forwardly through the flange 37 to provide the recessed angular surfaces, as indicated in FIGURE 1. Also, the rear wall 36 is provided with a wire-passing opening 41. An electric bulb socket 42 may be mounted on the interior or forward surface of the wall 36 by a suitably attached clip and the cable 43 will lead to a suitable source of power, for example, the ignition system of the car when it is mounted thereon.

My unit is mounted in cooperation with the ornament 10 as indicated in FIGURES 2 to 4. First the separated section 25 is mounted within the frame 11. This is accomplished by slipping the section forwardly into the frame until the front surface of the forward wall 27 engages the figurine 12. To do this, the recess 32 must be aligned with and slipped over the upper figurine-attaching lug 21 and, as shown in FIGURE 2, the lug will thereafter be located in the recess. At this time, the screw 24 will align with the opening 13 and may be threaded upwardly thereinto, it being understood that it will merely be necessary to substitute a longer screw 24 than that usually provided on the display unit 10 on the automobile. The screw 24 will attach the section 25 firmly but removably in the position indicated within the frame 12. Next, the section 26 is slipped into position and is mounted on the section 25. In slipping the section 25 forwardly, there is sufficient room to manipulate it upwardly and forwardly of the upper lugs 17 which project downwardly over the frame 11. However, unless the clearance notches 40 were provided, it would be impossible to pass the section 26 upwardly and forwardly into proper position over the section 25 as the upper lugs 17 would interfere therewith. It will be noted from FIGURE 2 that the flange of the section 25, when the section is in its final position, projects almost as far rearwardly as the frame 11 and when the section 26 is mounted thereon, the lugs 17 will be located in the notches 40 with their adjacent angular surfaces almost in contact. With the section 26 interfitted with and mounted on the section 25, the screws 39 may be inserted to hold the two sections in cooperation.

The removable bulb 45 in the socket 42, when energized, will provide a light which will be reflected by the concave reflector, provided by the wall 36, forwardly and be diffused through the front wall 27. This will provide illumination around the figurine 12, visible from the front of the car, to silhouette the figurine 12. The cable 43 may be connected in the electrical ignition system of the car so that each time the ignition key is turned on, the bulb 45 will be illuminated. The bulb can be replaced by removing the reflector section 26 from the section 25 which can be accomplished upon removal of the screws 39.

As indicated in FIGURE 6, in an earlier model of the figurine type ornament, different means for mounting it on the car was provided. In this instance, the frame 11a is provided with a single upper mounting lug 17a and a single lower mounting lug 16a. It is also provided with the opposed mounting lugs 50 projecting outwardly from opposite ends of the frame. The figurine 12 is mounted on the frame identically as before by means of the upper lug 21 and the lower lug 20.

The same identical illuminable display unit of my invention may be mounted on this ornament merely by providing a pair of mounting clips of the type designed 51 in FIGURE 8. This clip has a main flat outer end part which will extend outwardly into cooperative relationship with the adjacent lug 50 and a forwardly offset inner end 52 for extending inwardly into the adjacent notch 34a at the end of the section 26. One of the screws 39 is passed through an opening 54 in the clip end 52 and tapped into the socket 35. The outer end of the clip is secured to the lug 50 by means of a bolt 55 cooperating with the vertical slot 56 in the clip end.

Thus, the light-housing unit of my invention may be mounted with this model of ornament without any changes and merely by the provision of the additional simple clips 51. The light housing unit will function exactly as before.

It will be apparent from the above that I have provided a simple light reflector and lens unit combined into a compact light housing which can be easily mounted in the frame of a standard-type ornament to effectively display the figurine in silhouette and, if desired, to serve as a running light.

Having thus described this invention, what is claimed is:

1. In combination with an ornament comprising a border frame of substantial depth having a forward edge and a rear edge with a figurine mounted therein forwardly of said rear edge to provide a space between it and the rear edge, a light-housing unit mounted within the frame in said space behind the figurine, said unit comprising a forward translucent lens and a rear light reflector, and illuminating means between the reflector and the lens, said lens having a light-transmitting and diffusing face and a rearwardly extending peripheral flange which telescopes within the frame and which has a rear edge engaged by the reflector, means for removably attaching the reflector to the lens in engagement with said rear edge of the lens flange, and means for removably securing the light-housing unit in said space within said border frame comprising releasable connecting means extending between said unit and said frame.

2. The combination of claim 1 in which said illuminating means between the reflector and the lens comprises a light-carrying socket mouned on the reflector, said light reflector having a forwardly extending flange which engages with the rearwardly extending flange of the lens, said border frame being provided with mounting lugs, said lens flange and said reflector flange having clearance sockets for said lugs to permit mounting in said frame and which are provided by a pair of notches at the upper and rear side of said reflector flange which communicates with notches in the rear surface of the reflector that have rearwardly and downwardly inclined recessed surfaces and by a single notch in the lens flange which is provided with a downwardly and forwardly inclined recessed surface.

3. The combination of claim 2 in which said figurine is mounted in the border frame by means including an upper lug which is downwardly and forwardly inclined and is received in said last-named notch.

4. The combination of claim 3 in which said mounting lugs for the border frame comprise a pair of upper lugs which extend downwardly and rearwardly over the frame and which are received within said pair of notches in said reflector.

References Cited

UNITED STATES PATENTS

| D. 89,451 | 3/1933 | Sauer | 240—8.3 |
| 1,603,216 | 10/1926 | Semler | 240—8.2 |
| 1,998,680 | 4/1935 | Lint | 240—7.1 |
| 3,032,646 | 5/1962 | Chieger | 240—8.2 |
| 3,065,340 | 11/1962 | Mead et al. | 240—41.5 |
| 3,196,267 | 7/1965 | Abolins | 240—8.2 |

NORTON ANSHER, *Primary Examiner.*

WYNDHAM M. FRYE, *Assistant Examiner.*